US008713159B2

(12) United States Patent  
Tachibana et al.

(10) Patent No.: US 8,713,159 B2  
(45) Date of Patent: Apr. 29, 2014

(54) MONITORING APPARATUS FOR MONITORING COMMUNICATION CONFIGURATIONS OF CLIENT DEVICES

(75) Inventors: Ikuko Tachibana, Kawasaki (JP);  
Takashi Tanifuji, Kawasaki (JP);  
Toshiaki Hayashi, Kawasaki (JP);  
Yoshihiro Kimura, Kawasaki (JP);  
Tomohiro Hikita, Sendai (JP);  
Yasutaka Tanikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 763 days.

(21) Appl. No.: 12/507,265

(22) Filed: Jul. 22, 2009

(65) Prior Publication Data

US 2009/0287818 A1  Nov. 19, 2009

Related U.S. Application Data

(63) Continuation of application No. PCT/JP2007/053280, filed on Feb. 22, 2007.

(51) Int. Cl.  
*G06F 15/173*  (2006.01)

(52) U.S. Cl.  
USPC ............................ 709/224; 709/206; 709/220

(58) Field of Classification Search  
CPC ..... H04L 69/40; H04L 41/0681; H04L 41/06; H04L 1/00  
USPC .......................................... 709/206, 224, 220  
See application file for complete search history.

(56) References Cited

U.S. PATENT DOCUMENTS 6,314,088 B1 11/2001 Yamano  
6,654,914 B1 11/2003 Kaffine et al.

FOREIGN PATENT DOCUMENTS

| JP | 6-46057 | 2/1994 |
|----|---------|--------|
| JP | 9-214492 | 8/1997 |
| JP | 10-98480 | 4/1998 |
| JP | 11-127159 | 5/1999 |
| JP | 2003-532211 | 10/2003 |
| JP | 2004-326667 | 11/2004 |
| JP | 2006-50137 | 2/2006 |

OTHER PUBLICATIONS

International Search Report mailed Mar. 20, 2007 for International Application No. PCT/JP2007/053280.

*Primary Examiner* — Liangche A Wang  
(74) *Attorney, Agent, or Firm* — Staas & Halsey LLP

(57) ABSTRACT

A monitoring apparatus for monitoring communication configurations of a plurality of client devices connected to a server, the monitoring apparatus includes: a processor for controlling the communications between the client devices and the server in accordance with a process including: receiving from each of the client devices communication condition information and storing latest communication condition information of each of the client devices; determining at a time interval whether any of client devices became incapable of communication with the server by checking the latest communication condition information of each of client devices; and upon detection of at least one of the client devices for which obsolete communication condition information is stored, issuing a notice indicating that the at least one of the client devices are incapable of communication with the server.

6 Claims, 21 Drawing Sheets

Fig. 5

CLIENT INFORMATION 500

| No. | CLIENT | | | | |
|---|---|---|---|---|---|
| 1 | — | | | | |
| 2 | CLIENT NAME | 402 | | | |
| 3 | MANAGER NAME | | 403 | | |
| 4 | MANAGER EMAIL ADDRESS | | | 404 | |
| 5 | MANAGER CONTACT ADDRESS | | | | 405 |

Fig. 6

CONNECTION INFORMATION 600

| No. | MONITORING CENTER |
|---|---|
| 1 | CLIENT ID — 401 |
| 2 | SMTP SERVER NAME — 602 |
| 3 | AUTHENTICATING INFORMATION — 603 |
| 4 | TRANSMISSION-SOURCE EMAIL ADDRESS — 604 |
| 5 | PERIODIC-CONNECTION SCHEDULE — 605 |

Fig. 7

CONNECTION INFORMATION 700

| No. | CLIENT | |
|---|---|---|
| 1 | - | |
| 2 | SMTP SERVER NAME | 602 |
| 3 | AUTHENTICATING INFORMATION | 603 |
| 4 | TRANSMISSION-SOURCE EMAIL ADDRESS | 604 |
| 5 | PERIODIC-CONNECTION SCHEDULE | 605 |

Fig. 8

MONITORING INFORMATION 800

| No. | MONITORING CENTER | RECITAL |
|---|---|---|
| 1 | CLIENT ID | |
| 2 | PERIODIC-CONNECTION SCHEDULE | |
| 3 | STATE | 0: NOT CONNECTED<br>1: NORMAL<br>2: TIME OUT |
| 4 | TIME-OUT TIMES | |

MANAGEMENT INFORMATION 900

| No. | MONITORING CENTER | RECITAL |
|---|---|---|
| 1 | CLIENT ID | |
| 2 | SMTP SERVER NAME | |
| 3 | STATE | 0: NOT CONNECTED<br>1: NORMAL<br>2: TIME OUT |
| 4 | GROUP | |
| 5 | FLAG | OFF: NOT CHANGED<br>ON: CHANGED |
| 6 | SMTP SERVER NAME<br>(BEFORE CHANGING) | |

| CLIENT ID | SMTP SERVER NAME | STATE | GROUP | FLAG | SMTP SERVER NAME (BEFORE CHANGING) |
|---|---|---|---|---|---|
| | 1102 | 1103 | 1104 | 1105 | 1106 |
| A | a.xxx.fujitsu.com | 0 | a | OFF | a.xxx.fujitsu.com |
| B | a.xxx.fujitsu.com | 0 | a | OFF | a.xxx.fujitsu.com |
| C | a.xxx.fujitsu.com | 0 | a | OFF | a.xxx.fujitsu.com |

| 1201 | 1202 | 1203 | 1204 | 1205 | 1206 |
|---|---|---|---|---|---|
| CLIENT ID | SMTP SERVER NAME | STATE | GROUP | FLAG | SMTP SERVER NAME (BEFORE CHANGING) |
| A | a.xxx.fujitsu.com | 0 | a | OFF | a.xxx.fujitsu.com |
| B | a.xxx.fujitsu.com | 0 | a | OFF | a.xxx.fujitsu.com |
| D | b.xxx.fujitsu.com | 0 | b | OFF | b.xxx.fujitsu.com |

| CLIENT ID | SMTP SERVER NAME | STATE | GROUP | FLAG | SMTP SERVER NAME (BEFORE CHANGING) |
|---|---|---|---|---|---|
| 1501 | 1502 | 1503 | 1504 | 1505 | 1506 |
| A | a.xxx.fujitsu.com | 1 | a | OFF | a.xxx.fujitsu.com |
| B | a.xxx.fujitsu.com | 1 | a | OFF | a.xxx.fujitsu.com |
| C | z.xxx.fujitsu.com | 1 | a | ON | a.xxx.fujitsu.com |
| D | b.xxx.fujitsu.com | 1 | b | OFF | b.xxx.fujitsu.com |

| CLIENT ID 1601 | SMTP SERVER NAME 1602 | STATE 1603 | GROUP 1604 | FLAG 1605 | SMTP SERVER NAME 1606 |
|---|---|---|---|---|---|
| A | a.xxx.fujitsu.com | 1 | a | OFF | a.xxx.fujitsu.com |
| B | a.xxx.fujitsu.com | 1 | a | OFF | a.xxx.fujitsu.com |
| C | a.xxx.fujitsu.com | 1 | a | OFF | a.xxx.fujitsu.com |
| D | y.xxx.fujitsu.com | 1 | b | OFF | y.xxx.fujitsu.com |

| CLIENT ID | SMTP SERVER NAME | STATE | GROUP | FLAG | SMTP SERVER NAME (BEFORE CHANGING) | MANAGER NAME |
|---|---|---|---|---|---|---|
| A | a.xxx.fujitsu.com | 2 | a | OFF | a.xxx.fujitsu.com | AAAAAA |
| B | z.xxx.fujitsu.com | 1 | a | ON | a.xxx.fujitsu.com | BBBBBB |
| C | z.xxx.fujitsu.com | 1 | a | ON | a.xxx.fujitsu.com | CCCCCC |
| D | z.xxx.fujitsu.com | 1 | b | OFF | z.xxx.fujitsu.com | DDDDDD |

| CLIENT ID 1901 | SMTP SERVER NAME 1902 | STATE 1903 | GROUP 1904 | FLAG 1905 | SMTP SERVER NAME (BEFORE CHANGING) 1906 | MANAGER NAME 1907 |
|---|---|---|---|---|---|---|
| A | a.xxx.fujitsu.com | 2 | a | OFF | a.xxx.fujitsu.com | AAAAAA |
| B | z.xxx.fujitsu.com | 1 | b | OFF | z.xxx.fujitsu.com | BBBBBB |
| C | z.xxx.fujitsu.com | 1 | b | OFF | z.xxx.fujitsu.com | CCCCCC |
| D | z.xxx.fujitsu.com | 1 | b | OFF | z.xxx.fujitsu.com | DDDDDD |

| CLIENT ID | SMTP SERVER NAME | STATE | GROUP | FLAG | SMTP SERVER NAME (BEFORE CHANGING) | MANAGER NAME |
|---|---|---|---|---|---|---|
| A | a.xxx.fujitsu.com | 2 | a | OFF | a.xxx.fujitsu.com | AAAAAA |
| B | z.xxx.fujitsu.com | 1 | a | ON | a.xxx.fujitsu.com | AAAAAA |
| C | z.xxx.fujitsu.com | 1 | a | ON | a.xxx.fujitsu.com | AAAAAA |
| D | z.xxx.ffffff.com | 1 | b | OFF | z.xxx.ffffff.com | DDDDDD |

Fig. 21

| CLIENT ID | SMTP SERVER NAME | STATE | GROUP | FLAG | SMTP SERVER NAME (BEFORE CHANGING) | MANAGER NAME |
|---|---|---|---|---|---|---|
| A | a.xxx.fujitsu.com | 2 | a | OFF | a.xxx.fujitsu.com | AAAAAA |
| B | z.xxx.fujitsu.com | 1 | c | OFF | z.xxx.fujitsu.com | AAAAAA |
| C | z.xxx.fujitsu.com | 1 | c | OFF | z.xxx.fujitsu.com | AAAAAA |
| D | z.xxx.fffff.com | 1 | b | OFF | z.xxx.fffff.com | DDDDDD |

2100
2101 2102 2103 2104 2105 2106 2107

MONITORING APPARATUS FOR MONITORING COMMUNICATION CONFIGURATIONS OF CLIENT DEVICES

CROSS-REFERENCE TO RELATED APPLICATION

This application is based upon and claims the benefit of priority of and is a continuation of the prior International Application No. PCT/JP2007/053280, filed on Feb. 22, 2007, the entire contents of which are incorporated herein by reference.

FIELD

A certain aspect of the embodiments discussed herein is related to a monitoring apparatus that monitors the communication configuration of a client device.

BACKGROUND

A monitoring center monitors the operation situations of a plurality of client devices, and detects the abnormality of the client device. Specifically, the monitoring center receives an email for checking the connection that periodically checks the connection from a client device via an email server. Upon receiving an email for checking the connection after passage of a predetermined time or more, the monitoring center determines that an abnormality is generated in the client device. Further, a supporting member directly sends a notification indicating the abnormality is generated in the client device to a user or manager of the client device that detects the abnormality.

In fact, the setting of the email server in the client device is not changed even after changing the email server in a large number of abnormalities detected by the monitoring center. There is a troublesome problem that the supporting member specifies the change of setting of the email server each time and notifies the change of a user of the client device or manager.

Techniques regarding to the monitoring apparatus are disclosed in Japanese Laid-open Patent Publication No. 2004-326667.

SUMMARY

According to an aspect of an embodiment, a monitoring apparatus for monitoring communication configurations of a plurality of client devices connected to a server, the monitoring apparatus includes: a processor for controlling the communications between the client devices and the server in accordance with a process including: receiving from each of the client devices communication condition information and storing latest communication condition information of each of the client devices; determining at a time interval whether any of client devices became incapable of communication with the server by checking the latest communication condition information of each of client devices; and upon detection of at least one of the client devices for which obsolete communication condition information is stored, issuing a notice indicating that the at least one of the client devices are incapable of communication with the server.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is client information 500 according to the embodiment.
FIG. 6 is connection information 600 according to the embodiment.
FIG. 7 is connection information 700 according to the embodiment.
FIG. 8 is monitoring information 800 according to the embodiment.
FIG. 9 is management information 900 according to the embodiment.
FIG. 11 is a management information table 1100 of a client device managed by the monitoring center 301 according to the embodiment.
FIG. 12 is a management information table 1200 of a client device managed by the monitoring center 301 according to the embodiment.
FIG. 15 is a management information table 1500 of a client device managed by the monitoring center 301 according to the embodiment.
FIG. 16 is a management information table 1600 of the client device managed by the monitoring center 301.
FIG. 18 is a management information table 1800 of the client device managed by the monitoring center 301 according to the embodiment.
FIG. 19 is a management information table 1900 of the client device managed by the monitoring center 301 according to the embodiment.
FIG. 20 is a management information table 2000 of the client device managed by the monitoring center 301 according to the embodiment.
FIG. 21 is a management information table 2100 of the client device managed by the monitoring center 301 according to the embodiment.

DESCRIPTION OF THE EMBODIMENTS

Figure 1:
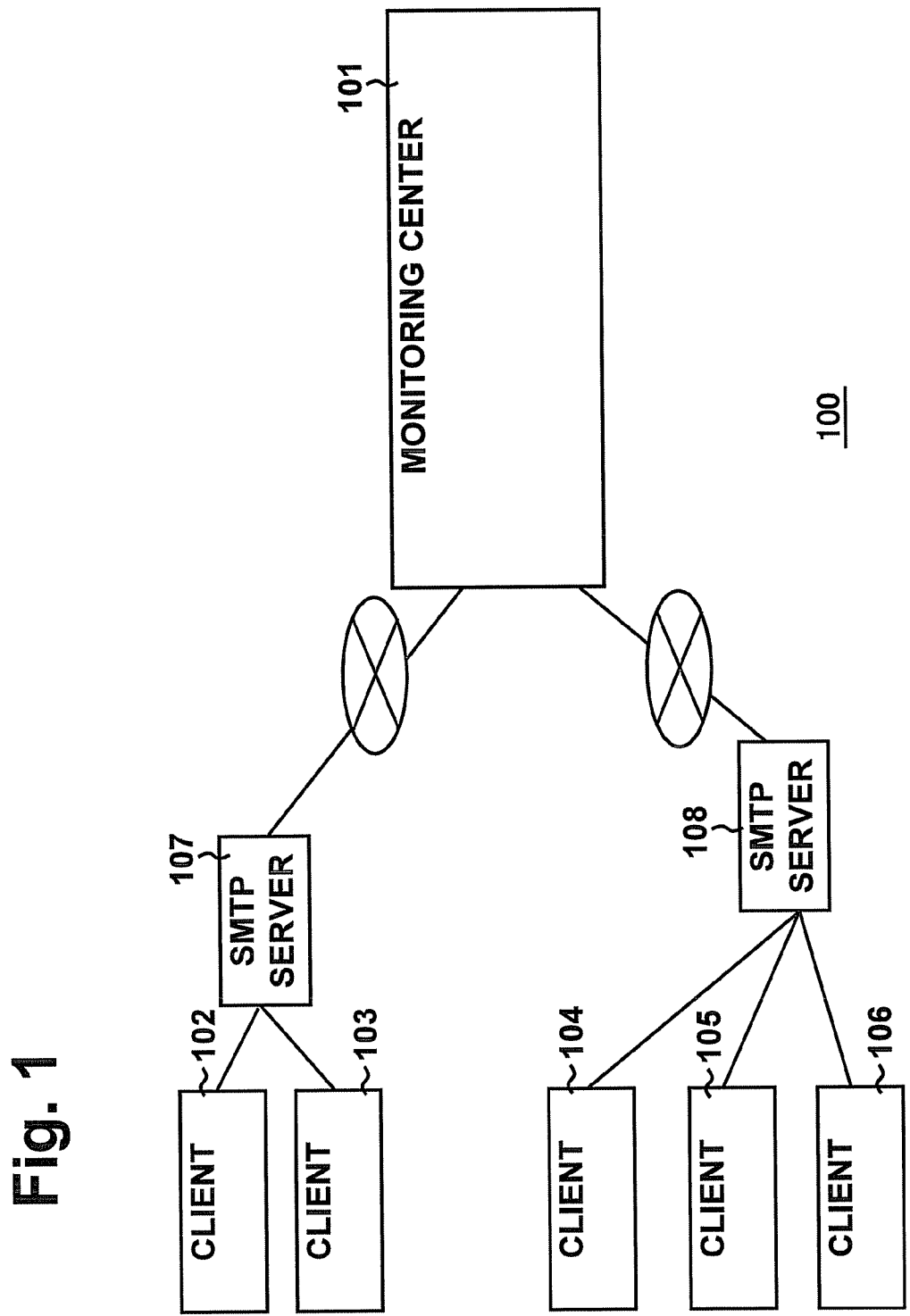
FIG. 1 is a diagram of a monitoring system 100 according to an embodiment.

FIG. 1 is a diagram of a monitoring system 100 according to the embodiment.
In FIG. 1, the monitoring system 100 includes: a monitoring center (Monitoring Center) 101; client devices (Clients) 102, 103, 104, 105, and 106; and SMTP servers (SMTP Servers) 107 and 108.

The client devices 102 and 103 transmit and receive emails via an SMTP (Simple Mail Transfer Protocol) server 107. The monitoring center 101 receives a periodic connection notifying email from the client devices 102 and 103 via the SMTP server 107. The client devices 104, 105, and 106 transmit and receive emails with the SMTP server 108. The monitoring center 101 receives the periodic connection notifying emails from the client devices 104, 105, and 106 via the SMTP server 108.

The monitoring center 101 monitors whether or not there is a periodic connection notifying email from the client devices 102, 103, 104, 105, and 106. When a periodic connection email is not received after passage of a predetermined time, the monitoring center 101 determines that an abnormality is caused in the client device corresponding to the non-received periodic connection email. The time interval for receiving the periodic connection email can change the setting, and is variable.

The monitoring center 101 has management information. The monitoring center 101 manages the management information that is divided into a group of the client devices 102 and 103 that use the SMTP server 107 and a group of the client devices 104, 105, and 106 that use the SMTP server 108. Further, the management information includes a changing flag indicating whether or not a corresponding relationship between the client device and the SMTP server is changed.

When the connection notifying email is not received from at least one of the client devices 102, 103, 104, 105, and 106, the monitoring center 101 refers to the management information. Further, the monitoring center 101 analyzes a factor that the connection notifying email is not notified on the basis of the management information. When a factor is a miss of change of setting of the SMTP server in the client device, the monitoring center 101 sends a notification indicating the miss of the change of setting of the SMTP server to a manager of the client device. Thus, it is possible to prevent the miss of the change of setting of the SMTP server in the client device, and to solve a load of the supporting member corresponding thereto.

Figure 2:
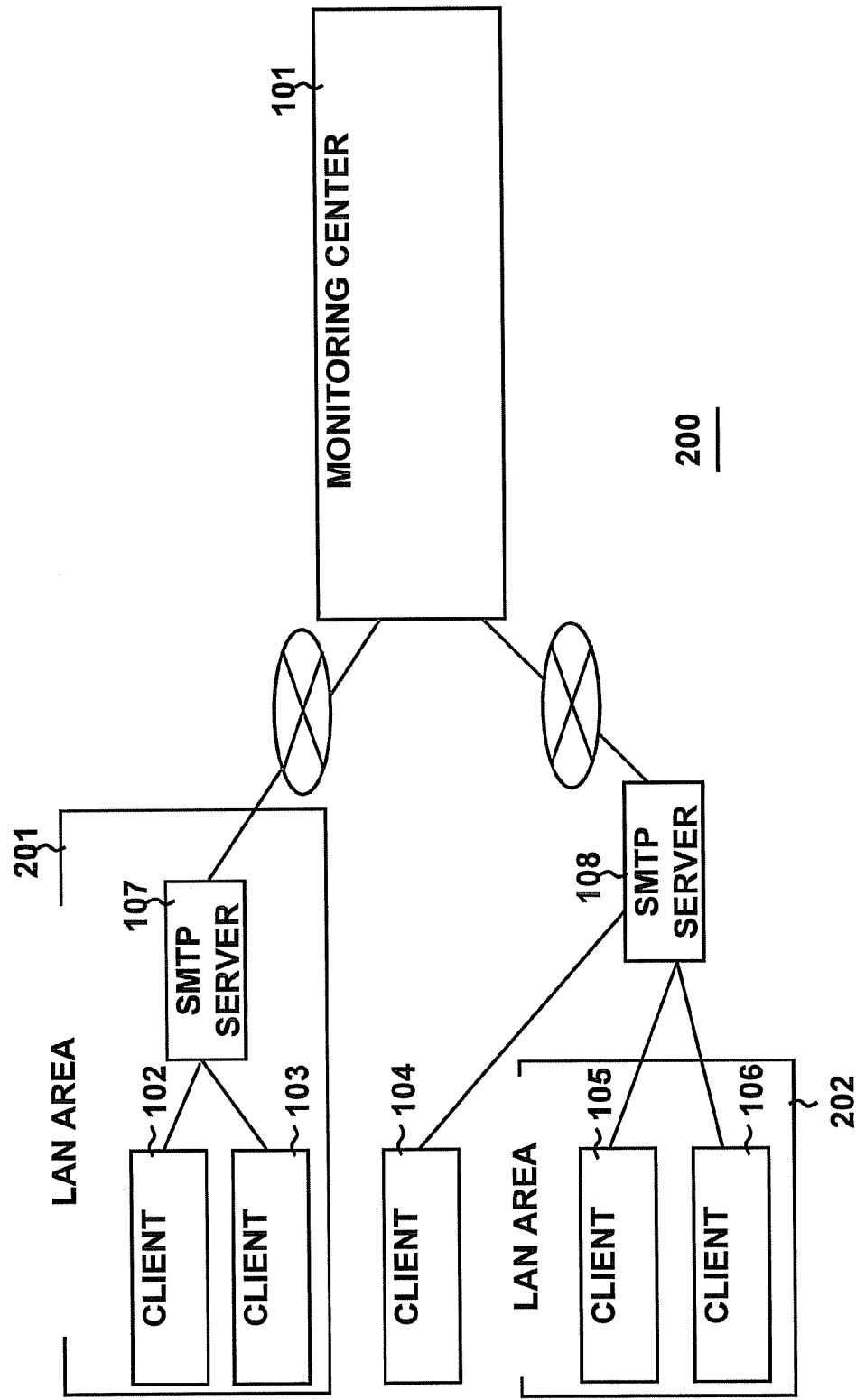
FIG. 2 is a diagram of a monitoring system 200 according to the embodiment.

FIG. 2 is a diagram of a monitoring system 200 according to the embodiment.

The monitoring system 200 includes: the monitoring center 101; the client devices 102, 103, 104, 105, and 106; and the SMTP servers 107 and 108. Further, the client device 102 and the client device 103 form a local area network 201, and the client devices 105 and 106 form a local area network 202.

Similar to the monitoring system 100 shown in FIG. 1, in the monitoring system 200, the client devices 102 and 103 transmit and receive an email by using the SMTP server 107. The client devices 104, 105, and 106 transmit and receive an email by using the SMTP server 108.

The monitoring center 101 monitors whether or not a periodic connection notifying email is received from the client devices 102, 103, 104, 105, and 106. When the periodic connection email is not received after passage of a predetermined time, the monitoring center 101 determines that an abnormality is caused in the client device corresponding to the non-received periodic connection email.

The monitoring center 101 has the management information. Upon determining that the abnormality is caused in the client device, the management information is referred to. Further, the monitoring center 101 analyzes a factor that the connection notifying email is not notified on the basis of the management information. When the factor is that the change of setting of the SMTP server is missed in the client device, the monitoring center 101 sends a notification indicating that the change of setting of the SMTP server is missed to the manager of the client device.

The SMTP server 108 is connected to the client devices 105 and 106 in the local area network 202 and the client device 104 out of the local area network 202. Therefore, the manager of the client device 104 is different from the manager of the client device 105 and 106 in the local area network 202 in many cases. Further, there is a high possibility that the SMTP server 108 is an SMTP server of an ISP (Internet Services Provider). Therefore, when there are the client devices of different local area networks, the monitoring center 101 sends a notification indicating that the change of setting of the SMTP server of an ISP is missed corresponding thereto to the manager or the like.

Figure 3:
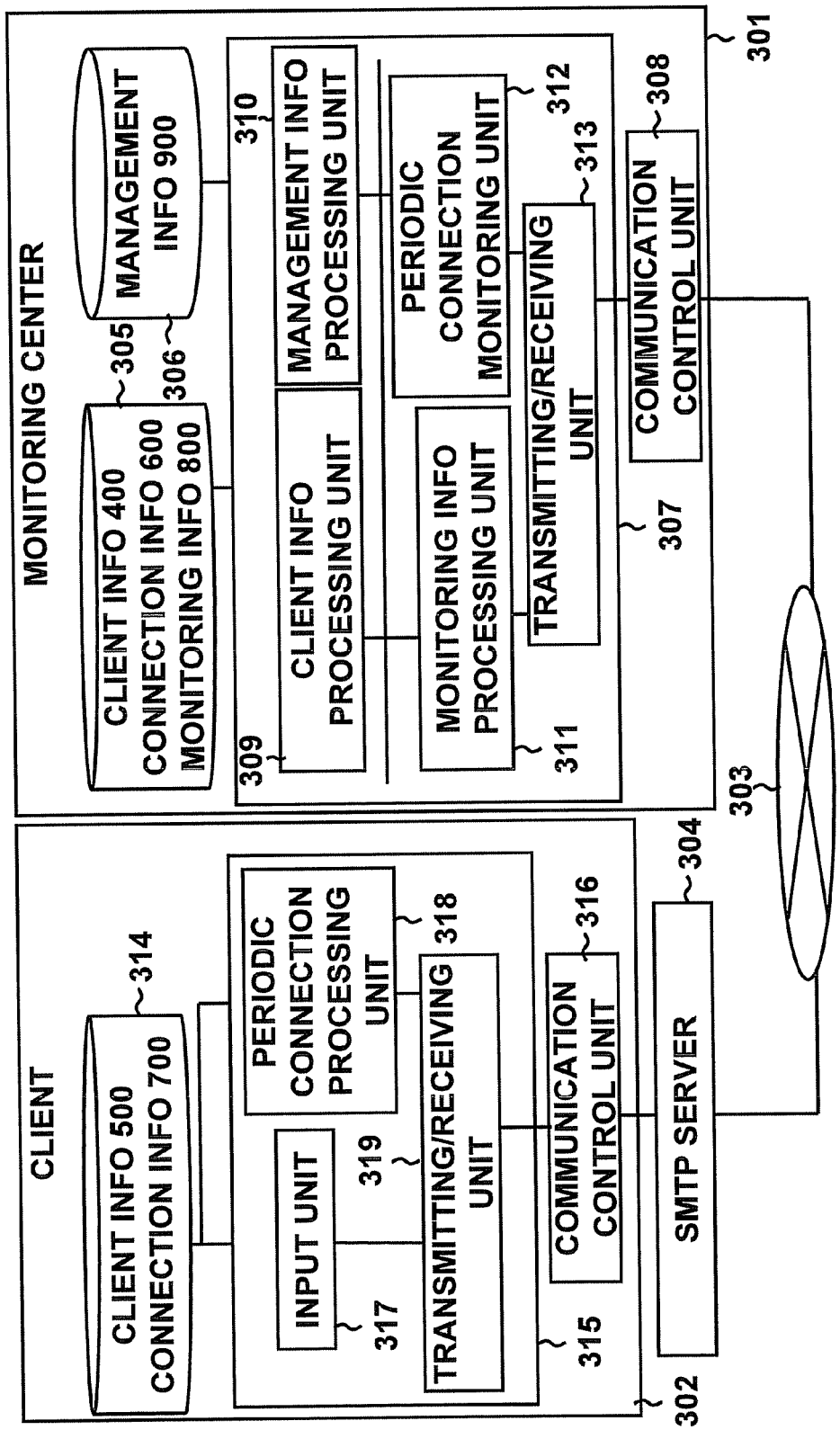
FIG. 3 is a block diagram showing a monitoring center 301 and a client device 302 according to the embodiment.

FIG. 3 is a block diagram of a monitoring center 301 and the client device 302 according to the embodiment.

The monitoring center 301 is connected to the client device 302 via a network 303 and an SMTP server 304. In general, there is an SMTP server between the monitoring center 301 and the network 303. However, the SMTP server is not shown according to the embodiment.

[Monitoring Center 301]

The monitoring center 301 includes: storing units 305 and 306; a remote center unit 307; and a communication control unit 308. The storing unit 305 stores: client information 400; connection information 600; and monitoring information 800. The storing unit 306 stores management information 900. The remote center unit 307 includes: a client information processing unit 309; a management information processing unit 310; a monitoring information processing unit 311; a periodic connection monitoring unit 312; and an email transmitting/receiving unit 313. The client information 400, the connection information 600, monitoring information 800, and management information 900 may be stored in the same storing unit.

Figure 4:
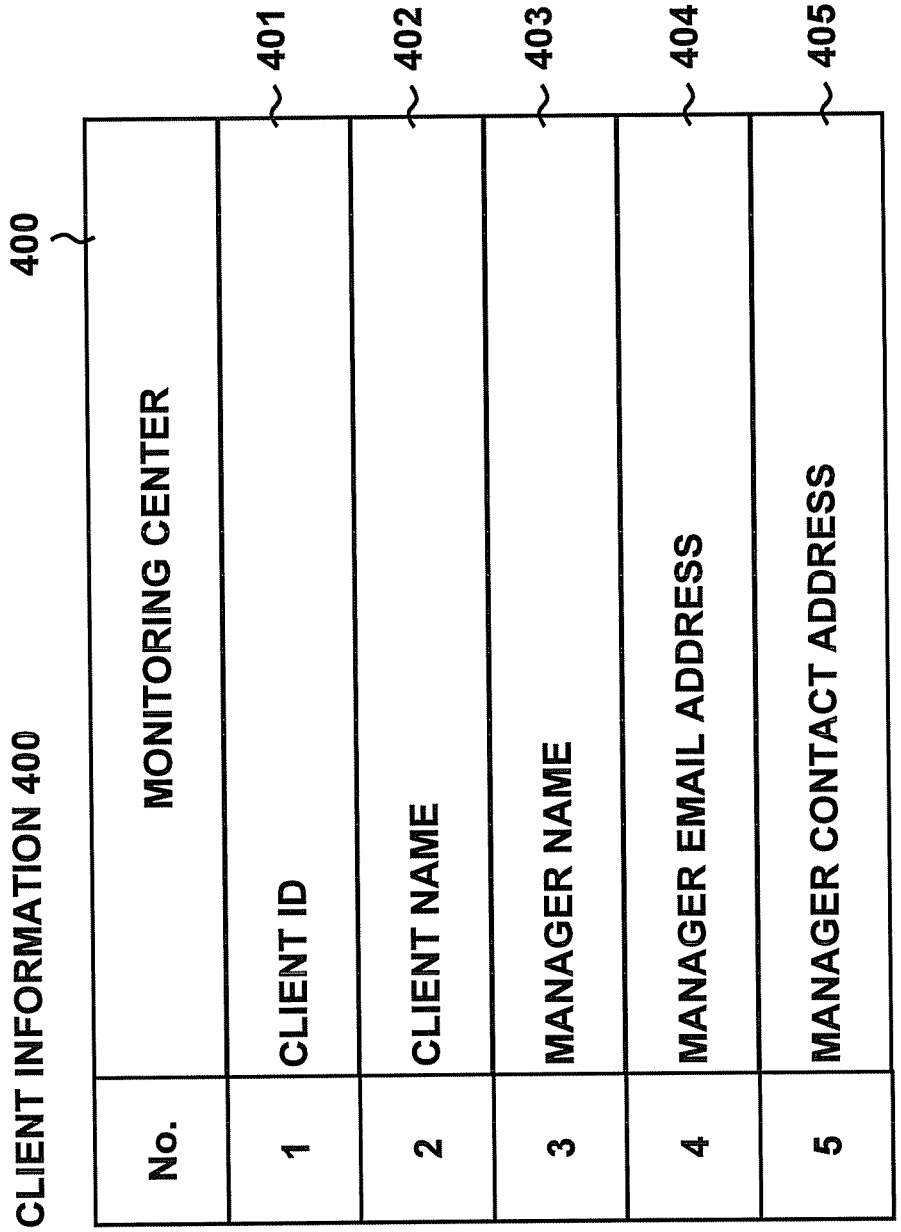
FIG. 4 is client information 400 according to the embodiment.

In FIG. 4, the client information 400 according to the embodiment is shown. The client information 400 is on a client that uses a client device 302. The client information 400 is identification information provided for the client device 302, and includes: a "CLIENT ID 401" that identifies the client device 302 from another client device, a "client name 402" indicating a name of a client that uses or owns the client device 302, a "manager name 403" indicating a name of a manager of the client device 302, a "manager email address 404" indicating an email address of the manager, and a "manager contact address 405" indicating a telephone number of the manager and a fax number.

In FIG. 6, connection information 600 according to the embodiment is shown. The connection information 600 corresponds to network connection between the monitoring center 301 and the client device 302. The connection information 600 indicates names of the "CLIENT ID 401" and the SMTP server 304, and includes an "SMTP SERVER name 602" that identifies the SMTP server 304 from another SMTP server, "authenticating information 603" used for authenticating the network connection between the SMTP SERVER 304 and the client device 302, a "transmission-source email address 604" indicating an email address provided for the client device 302, and a "periodic-connection schedule 605" indicating the time interval or the date and time for transmitting the periodic connection notifying email to the monitoring center by the client device 302. Herein, the periodic connection notifying email is received to monitor the network connection between the client device 302 and the monitoring center 301 by the monitoring center 301.

In FIG. 8, monitoring information 800 is shown according to the embodiment. The monitoring information 800 is used for monitoring the client device 301 by the monitoring center 301. The monitoring information 800 includes: a "CLIENT ID 401"; a "periodic-connection schedule 605"; an "STATE 803" indicating a state of the connection between the monitoring center 301 and the client device 302; and a "number 804 of time-out times of periodic-connection" indicating the number of times by which the monitoring center 301 does not receive the periodic connection notifying email to periodic-connection schedule 605 from the client device 302. When the STATE 803 indicates "0", the monitoring center 301 is not connected to the client device 302. When the STATE 803 indicates "1" and "2", the monitoring center 301 does not receive the periodic connection notifying email and time is out.

In FIG. 9, management information 900 according to the embodiment is shown. The management information 900 indicates that the client device 302 transmits an email by using the SMTP server 304, and other client devices that uses the SMTP server 304 and the client device 302 are divided into groups. The management information 900 includes: a "CLIENT ID 401"; an "SMTP SERVER name 602"; an "STATE 803"; a "GROUP 904" that divides the client devices (including the client device 302) using the SMTP server 304 into groups and distinguishes the group from a group of the client device that uses another SMTP server; an "FLAG 905" indicating the SMTP server used by the client device 302 is changed from another SMTP server to the SMTP server 304; and an "SMTP SERVER name 906 before changing" indicating the SMTP server used by the client device 302 before the SMTP server 304. When the FLAG 905 is "OFF", the change is not performed. When the FLAG 905 is "ON", the change is performed. When the SMTP server is not changed, the SMTP SERVER name 906 before changing is the same as the SMTP SERVER name 602.

The client information processing unit 309 executes processing for registering the client information 400 to the storing unit 305, processing for updating the client information 400, and processing for registering and updating the connection information 600. The management information processing unit 310 reads the management information 900 from the storing unit 306, and manages the connecting state of the client device 302 on the basis of the management information 900. Further, the management information processing unit 310 updates the management information 900. The monitoring information processing unit 311 performs updating processing of monitoring information 800 on the basis of connecting check from the client device. The periodic connection monitoring unit 312 reads the monitoring information 800 from the storing unit 305, monitors the connecting state of the client device 302 on the basis of the monitoring information 800, and further updates the monitoring information 800. The email transmitting/receiving unit 313 controls the transmission and reception of an email between the client device 302 and the monitoring center 301, and receives and transmits an email from/to the client device 302 via the communication control unit 308.

[Client Device 302]

The client device 302 includes: the storing unit 314; the remote agent unit 315; and the communication control unit 316. The storing unit 314 stores client information 500 and connection information 700. The remote agent unit 315 includes: an information input unit 317; a periodic connecting unit 318; and an email transmitting/receiving unit 319.

In FIG. 5, the client information 500 according to the embodiment is shown. The client information 500 is obtained by excluding the "CLIENT ID 401" from the client information 400. FIG. 7 is connection information 700 according to the embodiment. The connection information 700 is information obtained by excluding the "CLIENT ID 401" from the connection information 600.

The information input unit 317 performs registering and updating processing of the client information 500 and the connection information 700 in accordance with an input of a manager of the client device 302. Further, the information input unit 317 transmits the information processing units (periodic connection processing unit 318 and the email transmitting/receiving unit 319) provided for the client device 302 in accordance with the manager of the client device 302. The periodic connection processing unit 318 generates the periodic connection notifying email in accordance with a periodic-connection schedule 605. The email transmitting/receiving unit 319 controls the reception and transmission of an email such as a periodic connection notifying email between the client device 302 and the monitoring center 301, and receives and transmits an email from/to the monitoring center 301 via the communication control unit 316.

Figure 10:
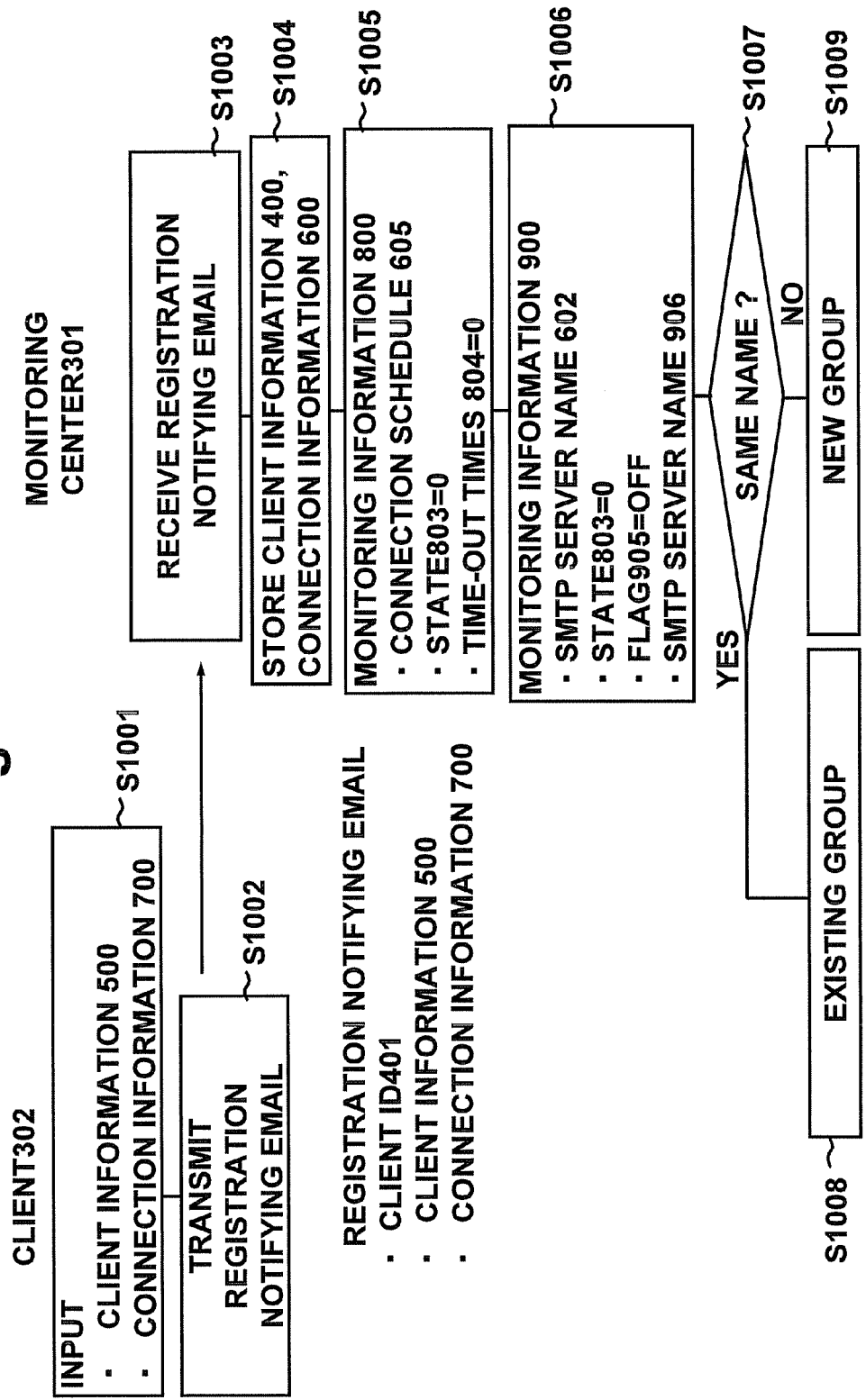
FIG. 10 is a flowchart showing registering processing of a client device 302 in the monitoring center 301 according to the embodiment.

FIG. 10 is a flowchart of processing for registering the client device 302 in the monitoring center 301 according to the embodiment.

In the client device 302, the manager inputs the client information 500 and the connection information 700 from the information input unit 317 (in S1001). Email reception and transmission 319 transmits a registration notifying email to the monitoring center 301 (in S1002). The registration notifying email includes: a CLIENT ID 401; client information 500; and connection information 700. In the monitoring center 301, a registration notifying email is received by the email transmitting/receiving unit 313 (in S1003). The client information processing unit 309 generates the client information 400 by combining the client information 500 and the CLIENT ID 401 included in the registration notifying email, and also generates the connection information 600 by combining the connection information 700 and the CLIENT ID 401. The client information processing unit 309 stores the client information 400 and the connection information 600 to the storing unit 305 (in S1004). The monitoring information processing unit 311 creates the monitoring information 800 (in S1005). In the initial setting, the monitoring information processing unit 311 sets the STATE 803 to "0", and also sets the number of time-out times of periodic connection to "0". The management information processing unit 310 creates the management information 900 (in S1006). In the initial setting, the management information processing unit 310 sets the STATE 803 to "0", the FLAG 905 to "OFF", and the SMTP SERVER name 906 before changing to the SMTP SERVER name 602.

The management information processing unit 310 determines whether or not another corresponding client device is connected to the same SMTP SERVER name as the SMTP SERVER name 602 (in S1007). When there is another client device (YES in S1007), the existing GROUP to which the other client device is set as a GROUP 904 of the client device 302 (in S1008). When there are not other client devices (NO in S1007), a new GROUP is set as the GROUP 904 of the client device 302 (in S1009). Herein, the new GROUP is different from the GROUP of the client device that uses the SMTP server different from the SMTP server 304.

In FIG. 11, the management information table 1100 of the client device managed by the monitoring center 301 is shown. Referring to FIG. 3, among the client devices to be connected to the monitoring center 301, the client device 302 is shown. Further, another client device is connected.

The management information table 1100 includes columns of: a CLIENT ID 1101; an SMTP SERVER name 1102; an STATE 1103; a GROUP ID 1104; an FLAG 105; and an SMTP SERVER name 1106 before changing.

The management information table 1100 shows that all the client devices to be connected to the monitoring center 301 use the same SMTP server 304. The CLIENT ID 401 of the client device 302 indicates "A", the SMTP SERVER name 602 of the SMTP server 304 is "a.xxx.fujitsu.com", a GROUP 904 is "a", and the SMTP SERVER name 906 before the change is "a.xxx.fujitsu.com". Similarly, the CLIENT IDs of other client devices are "B" and "C". The SMTP SERVER names 1102, the GROUPs 1104, and the SMTP SERVER names 1106 before change are the same as those of the client device 302. Further, the STATE 1103 is "0" to all the client devices, and the FLAG 1105 is "OFF" to all the client devices.

In FIG. 12, a management information table 1200 of the client device managed by the monitoring center 301 is shown.

The management information table 1200 includes columns of: a CLIENT ID 1201; an SMTP SERVER name 1202; an STATE 1203; a GROUP 1204; an FLAG 1205; and an SMTP SERVER name 1206 before change.

With the management information table 1200, the monitoring center 301 monitors the client device using the SMTP server 304 and the client device using another SMTP server. The CLIENT ID 401 of the client device 302 is "A", the SMTP SERVER name 602 of the SMTP server 304 is "a.xxx.fujitsu.com", the GROUP 904 is "a", and the SMTP SERVER name 906 before the change is "a.xxx.fujitsu.com". The CLIENT IDs of other client devices are "B" and "D". An SMTP SERVER name 1202, GROUP 1204, and SMTP SERVER name 1206 before the change corresponding to the client device of CLIENT ID "B" are the same as those of the client device 302. The SMTP SERVER name 1202 corresponding to the client device with the CLIENT ID "D" is "b.xxx.fujitsu.com", the GROUP 1204 is "b", and the SMTP SERVER name 1206 before the change is "b.xxx.fujitsu.com", unlike those of the client device 302. That is, the client device with the CLIENT ID "D" uses an SMTP server different from the SMTP server 304. The STATE 1203 is "0" to all the client devices, and the FLAG 1205 is "OFF" to all the client devices.

Figure 13:
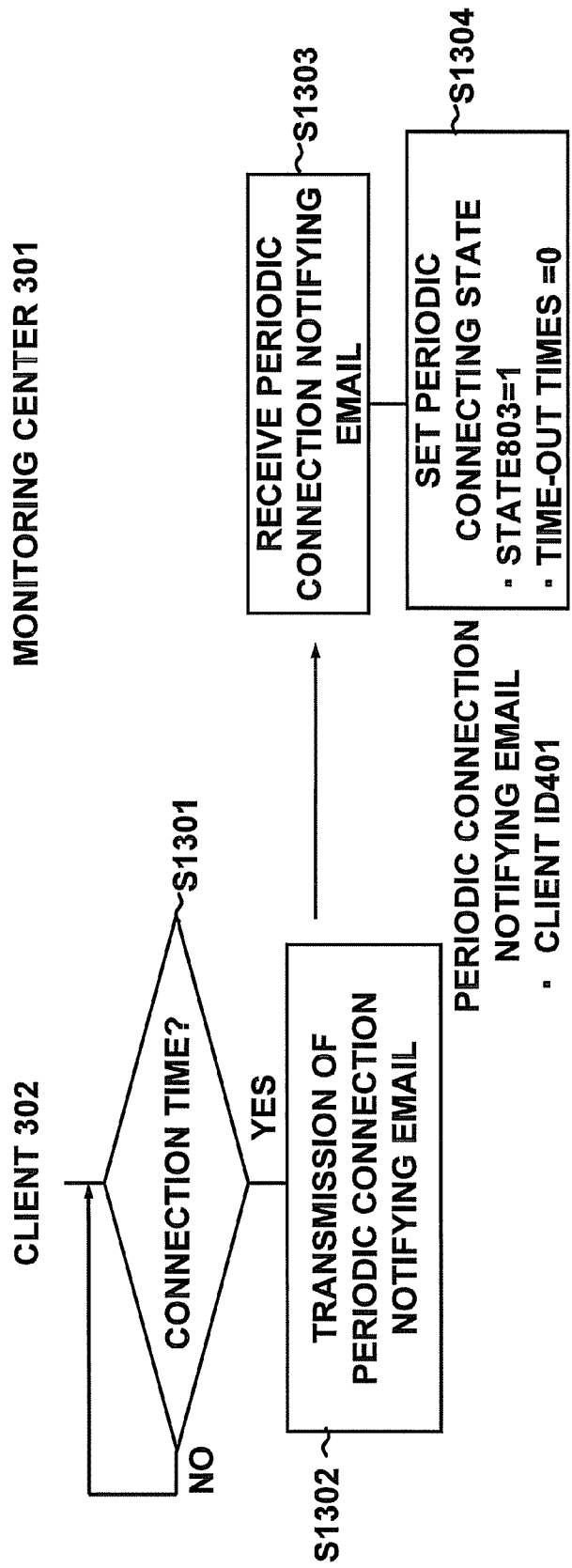
FIG. 13 is a flowchart of connecting processing for connecting the monitoring center 301 to a client device 302 according to the embodiment.

FIG. 13 is a flowchart of connecting processing for connecting the monitoring center 301 to the client device 302 according to the embodiment.

A periodic connection processing unit 318 of the client device 302 determines whether or not the time reaches the time (periodic-connection time) for transmitting the periodic connection notifying email by referring to a periodic-connection schedule 605 (in S1301). When the time does not reach the periodic-connection time (NO in S1301), the periodic connection processing unit 318 determines again whether or not the time reaches the periodic-connection time (in S1301). When it is determined again that the time reaches the periodic-connection time (YES in S1301), the periodic connection processing unit 318 instructs the transmission of the periodic connection notifying email to the monitoring center 301 to the email transmitting/receiving unit (in S1302). The periodic connection notifying email includes the CLIENT ID 401. The monitoring center 301 determines whether or not an abnormality is caused in the client device 301 in accordance with a fact that the periodic connection notifying email is received.

The email transmitting/receiving unit 313 in the monitoring center 301 receives the periodic connection notifying email (in S1303). The monitoring information processing unit 311 sets the periodic connecting state. That is, the monitoring information processing unit 311 sets the STATE 803 of the monitoring information 800 from "0" to "1". Further, the number 804 of time-out times of periodic-connection is "0" yet (in S1304). Herein, a fact that the STATE 803 is "1" indicates that the monitoring center 301 is normally connected to the client device 302, that is, a communicable state. The management information processing 310 sets the STATE 803 to "1".

Figure 14:
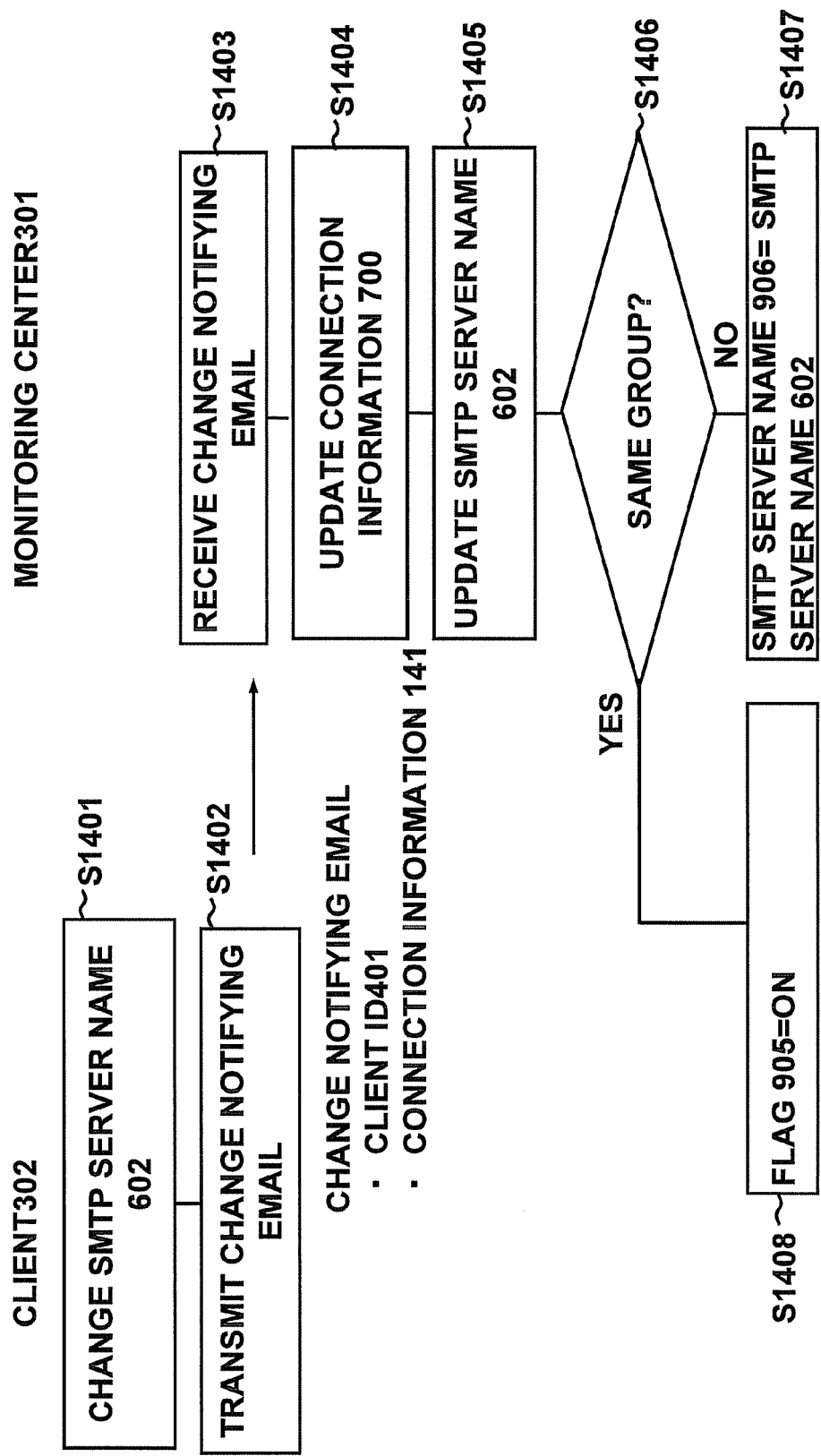
FIG. 14 is a flowchart of changing processing of the monitoring center 301 according to the embodiment.

FIG. 14 is a flowchart of changing processing of the monitoring center 301 according to the embodiment.

Upon changing the SMTP SERVER used by the client device, the information input unit 317 of the client device 301 inputs a new SMTP SERVER on the basis of an input of the manager in the client device, and changes an SMTP SERVER name 602 of the connection information 700 (in S1401). The email transmitting/receiving unit 319 transmits the change notifying email to the monitoring center 301 (in S1402). The change notifying email includes: the CLIENT ID 401; and the connection information 141. The connection information 141 changes the SMTP SERVER name 602 of the connection information 700 to a new SMTP SERVER name, and also changes the authenticating information 603 to new authenticating information.

The email transmitting/receiving unit 313 in the monitoring center 301 receives the change notifying email (in S1403). The client information processing unit 309 reads the connection information 600 having the CLIENT ID 401, also updates the SMTP SERVER name 602 to a new SMTP SERVER name, and further updates the authenticating information 603 to new authenticating information corresponding to a new SMTP SERVER name (in S1404). The management information processing unit 310 updates the SMTP SERVER name 602 of the management information 900 to a new SMTP SERVER name (in S1405).

The management information processing unit 310 determines whether or not the client device having the same GROUP as the GROUP 904 of the client device 302 is connected to the monitoring center 301 (in S1406). When the client device having the same GROUP as the GROUP 904 is not connected to the monitoring center 301 (NO in S1406), the management information processing unit 310 sets the SMTP SERVER name 906 before the change as a new SMTP SERVER name, and does not change the FLAG 905 as "OFF" (in S1407). When the client device having the same GROUP as the GROUP 904 is connected to the monitoring center 301 (YES in S1406), the management information processing unit 310 changes the FLAG 905 from "OFF" to "ON" (in S1408).

In FIG. 15, a management information table 1500 of the client device managed by the monitoring center 301 is shown. FIG. 15 shows the management information table corresponding to the case in which the client device having the same GROUP as the GROUP 904 in step S1406 in FIG. 14 is connected to the monitoring center 301.

The management information table 1500 includes columns of: a CLIENT ID 1501; an SMTP SERVER name 1502; an STATE 1503; a GROUP 1504; an FLAG 1505; and an SMTP SERVER name 1506 before the change.

The GROUP 1504 in the management information table 1500 includes "a" and "b". Further, the management information processing unit 310 determines the client device belongs to the GROUP "a", and updates the SMTP SERVER name of the SMTP server used by the client device having the CLIENT ID "C" from "a.xxx.fujitsu.com" to "z.xxx.fujitsu.com". The client devices having CLIENT IDs "A", "B", and "C" belong to the GROUP "a". Therefore, the FLAG 1505 of the client device having the CLIENT ID "C" is changed to "ON".

FIG. 16 corresponds to a management information table 1600 of the client device managed by the monitoring center 301. FIG. 16 shows the management information table when the client device having the same GROUP as the GROUP 904 is not connected to the monitoring center 301 in step S1406 in FIG. 14.

The management information table 1600 includes columns of: a CLIENT ID 1601; an SMTP SERVER name 1602; an STATE 1603; a GROUP 1604; an FLAG 1605; and an SMTP SERVER name 1606 before the change.

The GROUP 1604 of the management information table 1600 has "a" and "b". Further, the management information processing unit 310 determines the client device belongs to the GROUP "b", and changes the SMTP SERVER name of the SMTP server used by the client device having the CLIENT ID "D" from "b.xxx.fujitsu.com" to "y.xxx.fujitsu.com". Only the client device having the CLIENT ID "D" belongs to the GROUP "b". Therefore, the FLAG 1605 of the client device having the CLIENT ID "D" is "OFF" yet and updates the SMTP SERVER name before the change of the client device having the CLIENT ID "D" to "y.xxx.fujitsu.com".

Figure 17:
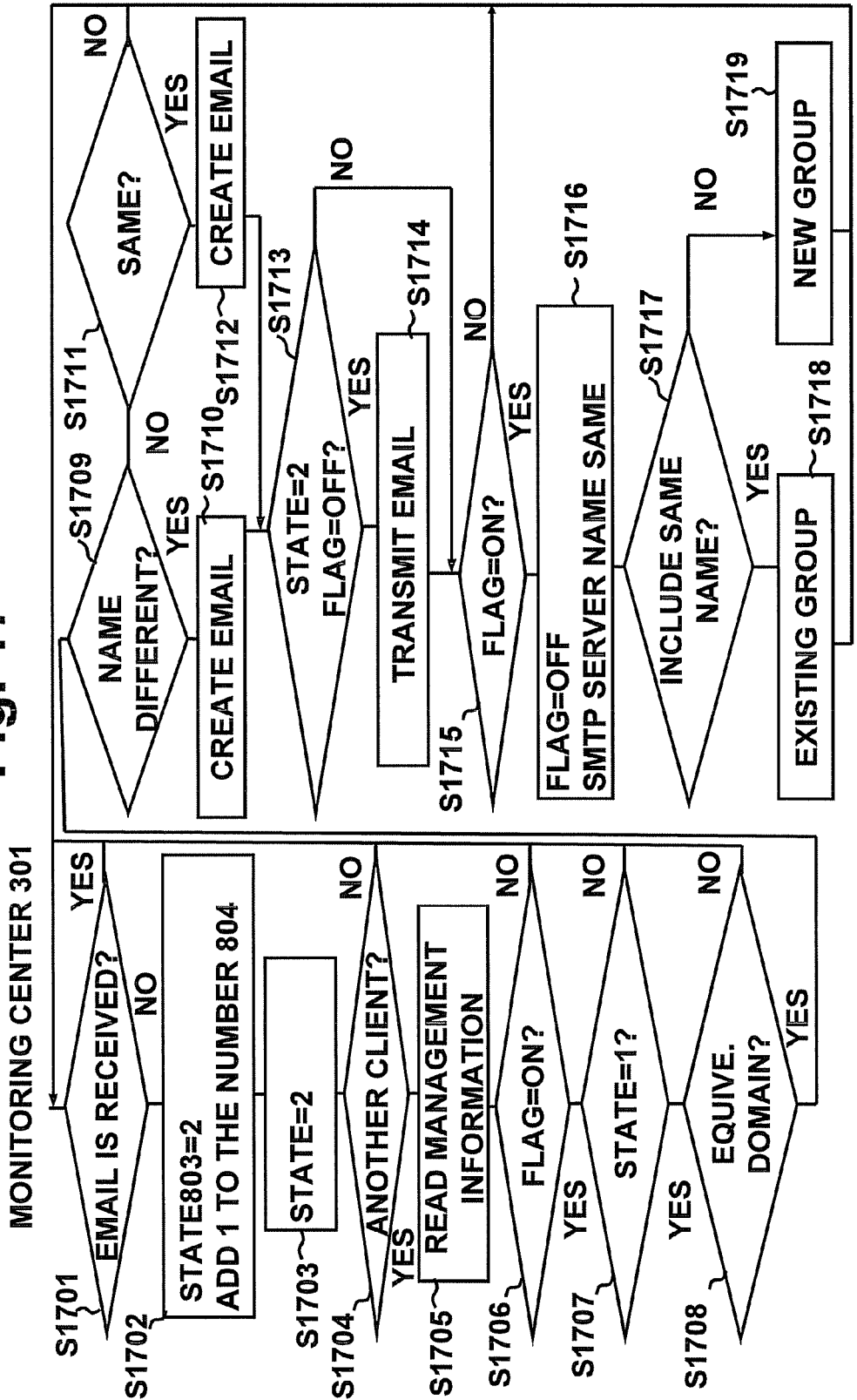
FIG. 17 is a flowchart of monitoring processing of connection of the client device 302 in the monitoring center 301 according to the embodiment.

FIG. 17 is a flowchart of connection monitoring processing of the client device 302 in the monitoring center 301 according to the embodiment.

The periodic connection monitoring unit 312 in the monitoring center 301 determines whether or not the periodic connection notifying email is received from the client device 302 (in S1701). When the monitoring center 301 receives the periodic connection notifying email (YES in S1701), the periodic connection monitoring unit 312 monitors again whether or not the periodic connection notifying email is received (YES in S1701). When the monitoring center 301 does not receive the periodic connection notifying email (NO in S1701), the periodic connection monitoring unit 312 updates the STATE 803 from "1" to "2", and adds one to the number 804 of time-out times of periodic-connection (in S1702). This means that, when the number 804 of time-out times of periodic-connection is "10", the number 804 of time-out times of periodic-connection is updated to "1" and, when the number 804 of time-out times of periodic-connection is "n", it is updated to "n+1".

The management information processing unit 310 sets the STATE 803 of the management information 900 to "2" (in S1703). The management information processing unit 310 determines whether or not there is another client device belonging to the GROUP 904 of the client device 302 (in S1704). When another client device corresponding to the GROUP 904 of the client device 301 does not exist (NO in S1704), the periodic connection monitoring unit 312 monitors again whether or not the periodic connection notifying email is received (in S1701). The management information processing unit 310 sends a notification indicating that the abnormality is caused in the client device 302 to the supporting member. The supporting member corresponds to the client device 302 in response to a notification from the monitoring center 301.

When there is another client device belonging to the GROUP 904 of the client device 302 (YES in S1704), the management information processing unit 310 reads the management information of the client device belonging to the GROUP 904 to a memory (not shown) (in S1705). The management information processing unit 310 determines whether or not the management information read in S1705 includes the FLAG set to "ON" (in S1706). When the read management information does not include the FLAG set to "ON" (NO in S1706), the periodic connection monitoring unit 312 monitors again whether or not the periodic connection notifying email is received (in S1701). The management information processing unit 310 sends a notification indicating that an abnormality is caused in the client device 302 to the supporting member.

When the read management information includes the FLAG set to "ON" (YES in S1706), the management information processing unit 310 determines whether or not the management information read in S1705 includes the STATE set to "1" (in S1707). When the read management information does not include the STATE set to "1" (NO in S1707), the periodic connection monitoring unit 312 monitors again whether or not the periodic connection notifying email is received (in S1701), the management information processing unit 310 sends a notification indicating that an abnormality is caused in the client device 302 to the supporting member.

When the read management information includes the STATE set to "1" (YES in S1707), the management information processing unit 310 determines whether or not the domain of the SMTP SERVER name of the client device in the STATE "1" is identical to the domain of the SMTP SERVER name before the change (in S1708). When the domain of the SMTP SERVER name is not identical to the domain of the SMTP SERVER name before the change (NO in S1708), the periodic connection monitoring unit 312 monitors again whether or not the periodic connection notifying email is received (in S1701), the management information processing unit 310 sends a notification indicating that an abnormality is caused in the client device 302 to the supporting member. Unlike the domain, it shows that the client device 302 and another client device belonging to the GROUP 904 can use different SMTP servers. Therefore, the support member needs to directly maintain the devices.

When the domain of the SMTP SERVER name is identical to the domain of the SMTP SERVER name before the change (YES in S1708), the management information processing unit 310 determines whether or not the manager name 403 of The client device 302 is identical to the manager name of the client device with the STATE "1" (in S1709). Herein, the manager name to be compared with the manager name 403 is the manager name of the client device to which the STATE is determined as "1" in S1707, belonging to the GROUP 904.

When the manager name compared in S1709 is different from the manager name 403 (YES in S1709), the management information processing unit 310 creates an email having contents indicating that "the SMTP server of ISP can be changed. The setting of the SMTP server is not changed. Change the setting." (in S1710).

When the manager name compared in S1709 is identical to the manager name 403 (NO in S1709), the management information processing unit 310 determines whether or not all the manager names of the client devices belonging to the GROUP 904 are identical (in S1711). When the manager names of the client devices are not identical (NO in S1711), the periodic connection monitoring unit 312 monitors again whether or not the periodic connection notifying email is received (in S1701). The management information processing unit 310 sends a notification indicating that the abnormality is caused in the client device 302 to the supporting member. When all the manager names of the client devices are identical (YES in S1711), the management information processing unit 310 creates an email having contents that "Your SMTP server can be changed. The setting of the SMTP server that is not changed. Change the setting" (in S1712).

Further, the management information processing unit 310 determines whether or not the STATE of the client device 302 is "2" and the FLAG is "OFF" (in S1713). When the STATE of the client device 302 is "2" and the FLAG is "OFF" (YES in S1713), the email transmitting/receiving unit 313 transmits the email created in S1710 or S1712 to the manager email address (in S1714), and the management information processing unit 310 determines whether or not the FLAG of the client device 302 is "ON" (in S1715). When the STATE of the client device 302 is "2" and the FLAG is not "OFF" (NO in S1713), the information processing unit 310 determines whether or not the FLAG of the client device 302 is "ON" (in S1715). When the FLAG of the client device 302 is not "ON", the periodic connection monitoring unit 312 monitors again whether or not the periodic connection notifying email is received (in S1701).

When the FLAG of the client device 302 is "ON", the management information processing unit 310 sets the FLAG 905 to "OFF", the SMTP SERVER name 906 before the change is set to be identical to the SMTP SERVER name 602 and is reset (in S1716). Further, it is determined whether or not the management information table stored in the storing unit 306 includes the same SMTP SERVER name as the SMTP SERVER name 602 set in S1716 (in S1717). When the management information table includes the same SMTP SERVER name as the SMTP SERVER name 602 (YES in S1718), the existing GROUP 904 is set as the GROUP of the client device 302 (in S1718). When the management information table does not include the same SMTP SERVER name as the SMTP SERVER name 602 (NO in S1718), a new GROUP 904 is set as the GROUP of the client device 302 (in S1719).

FIG. 18 is a management information table 1800 of the client device managed by the monitoring center 301. FIG. 18 shows the management information table corresponding to the case of transmitting an email created in step S1710 in FIG. 17 to the manager of the client device 302.

The management information table 1800 includes columns of a CLIENT ID 1801, an SMTP SERVER name 1802, an STATE 1803, a GROUP 1804, an FLAG 1805, an SMTP SERVER name 1806 before the change, and a manager name 1807. Incidentally, the management information table 1100 shown in FIG. 11 does not any columns corresponding to the manager name 1807. However, the present invention is not limited to this and the management information table 1800 may include a column of the manager corresponding to the manager name 1807.

The GROUP 1804 of the management information table 1800 has "a" and "b". The client device belonging to the GROUP "a" corresponds to client devices having the CLIENT IDs "A", "B", and "C". The client device belonging to the GROUP "b" corresponds to a client device having a CLIENT ID "D".

The client device having the CLIENT ID "A" has "a.xxx.fujitsu.com" as the SMTP SERVER name, the STATE "2", the FLAG "OFF", "a.xxx.fujitsu.com" as the SMTP SERVER name before the change, and a management name "AAAAA". Similarly, the client device having the CLIENT ID "B" has "z.xxx.fujitsu.com" as the SMTP SERVER name, the STATE "1", the FLAG "ON", "a.xxx.fujitsu.com" as the SMTP SERVER name before the change, and "BBBBB" as the management name. Similarly, the client device having the CLIENT ID "C" has "z.xxx.fujitsu.com" as the SMTP SERVER name, the STATE "1", the FLAG "ON", "a.xxx.fujitsu.com" as the SMTP SERVER name before the change, and a management name "CCCCC". Similarly, the client device having the CLIENT ID "D" has "z.xxx.fujitsu.com" as the SMTP SERVER name, the STATE "1", the FLAG "OFF", "z.xxx.fujitsu.com" as the SMTP SERVER name before the change, and a management name "DDDDD".

The client device having the CLIENT ID "A" has the STATE "2" and it is therefore determined that the abnormality is caused. Further, the client device having the CLIENT ID "A" belongs to the same GROUP "a" as the client devices having the CLIENT IDs "B" and "C". The client devices having CLIENT IDs "B" and "C" have the FLAG "ON", and the STATE "1". All the client devices having CLIENT IDs "A", "B", and "C" have the same SMTP SERVER name before the change, i.e., "a.xxx.fujitsu.com". Further, all the manager names of the client devices of the CLIENT IDs "A", "B", and "C" are different and an email having the same contents as those of an email created in S1710 is therefore created. Further, the email is transmitted to the manager "AAAAA" of the client device having CLIENT ID "A" with the STATE "2" and the FLAG "OFF". The client devices having the CLIENT IDs "B" and "C" have the FLAG "ON", and the management information processing unit 310 therefore sets the FLAGs of the client devices of the CLIENT IDs "B" and "C" to "OFF", and the SMTP SERVER name before the change resets "a.xxx.fujitsu.com" to "z.xxx.fujitsu.com". The client devices having the CLIENT IDs "B" and "C" have "z.xxx.fujitsu.com" as the SMTP SERVER name, and is identical to the SMTP SERVER name of CLIENT ID "D". Therefore, the management information processing unit 310 updates the GROUP of the client devices having the CLIENT IDs "B" and "C" to the existing GROUP "b". A result of updating the management information table 1800 by the management information processing unit 310 is the management information table shown in FIG. 19.

FIG. 20 is a management information table 2000 of the client device managed by the monitoring center 301. FIG. 20 shows the management information table corresponding to the case of transmitting an email created in step S1712 in FIG. 17 to the manager of the client device 302.

The management information table 2000 includes columns of a CLIENT ID 2001, an SMTP SERVER name 2002, an STATE 2003, a GROUP 2004, an FLAG 2005, an SMTP SERVER name 2006 before the change, and a manager name 2007.

The GROUP 2004 of the management information table 2000 has "a" and "b". The client device belonging to the GROUP "a" corresponds to the client device having the CLIENT IDs "A", "B", and "C". The client device belonging to the GROUP "b" corresponds to the client device having the CLIENT ID "D".

The client device with the CLIENT ID "A" has "a.xxx.fujitsu.com" as SMTP SERVER name, the STATE "2", the FLAG "OFF", "a.xxx.fujitsu.com" as the SMTP SERVER name before the change, and "AAAAAA" as a management name. Similarly, the client device with the CLIENT ID "B" has "z.xxx.fujitsu.com" as the SMTP SERVER name, the STATE "1", the FLAG "ON", "a.xxx.fujitsu.com" as the SMTP SERVER name before the change, and a management name "AAAAA". Similarly, the client device with the CLIENT ID "C" has "z.xxx.fujitsu.com" as SMTP SERVER name, the STATE "1", the FLAG "ON", "a.xxx.fujitsu.com" as the SMTP SERVER name before the change, and a management name "AAAAA". Similarly, the client device with the CLIENT ID "D" has "z.xxx.fffff.com" as SMTP SERVER name, the STATE "1", the FLAG "OFF", "z.xxx.fffff.com" as the SMTP SERVER name before the change, and a management name "DDDDD".

When the client device with the CLIENT ID "A" has the STATE "2", it is determined that the abnormality is caused. Further, the client device with the CLIENT ID "A" belongs to the same GROUP "a" as that of the client devices with the CLIENT IDs "B" and "C". The client devices with CLIENT IDs "B" and "C" have the FLAG "ON", the STATE "1". The client devices with CLIENT IDs "A", "B", and "C" have "a.xxx.fujitsu.com" as the same SMTP SERVER name before the change. Further, the client devices with the CLIENT IDs "A", "B", and "C" have "AAAAA" as the same manager names. Thus, an email having the same contents as those of an email created in S1712 is created. Further, the created email is transmitted to the manager "AAAA" of the client device with the CLIENT ID "A", the STATE "2", and the FLAG "OFF". Since the FLAGs of the client devices with the CLIENT IDs "B" and "C" are "ON", the management information processing unit 310 sets the FLAGs of the client devices with the CLIENT IDs "B" and "C" to "OFF", and resets "a.xxx.fujitsu.com" as the SMTP SERVER name before the change to "z.xxx.fujitsu.com". The SMTP SERVER names of the client devices with CLIENT IDs "B" and "C" are "z.xxx.fujitsu.com" different from the SMTP SERVER name with the CLIENT IDs "A" and "D". The client device having "z.xxx.fujitsu.com" in the management information table 2000 is only the client devices with the CLIENT IDs "B" and "C". Therefore, the management information processing unit 310 updates the GROUP of the client devices with the CLIENT IDs "B" and "C" to a new GROUP "c" different from the GROUPS "a" and "b". A result of updating the management information table 2000 by the management information processing unit 310 is the management information table 2100 shown in FIG. 21.

INDUSTRIAL APPLICABILITY

A monitoring apparatus according to the present invention suppresses the occurrence of miss of change in setting of an email server in a client device as a monitoring target. Therefore, the monitoring apparatus according to the present invention is extremely advantageous for a monitoring system in which the email server used by the monitoring client device is changed.

All examples and conditional language recited herein are intended for pedagogical purposes to aid the reader in understanding the invention and the concepts contributed by the inventor to furthering the art, and are to be construed as being without limitation to such specifically recited examples and condition, nor does the organization of such examples in the specification relate to a showing of superiority and inferiority of the invention. Although the embodiment of the present inventions have been described in detail, it should be understood that the various changes, substitutions, and alternations could be made hereto without departing from the spirit and scope of the invention.

What is claimed is:

1. A monitoring apparatus comprising:
a storing unit that stores management information for a plurality of client devices including information on grouping of the client devices; and
a computer processor that executes a process for monitoring communication configurations of the plurality of client devices by:
identifying a first client device and a second client device from among the plurality of client devices, the first client device not operable to communicate with a corresponding server set in a communication configuration of the first client device, the second device grouped with the first client device in the management information and operable to communicate with a corresponding server set in a communication configuration of the second client device,
executing a process for notifying the second device of a changed communication configuration when the corresponding server of the second device belongs to a domain equivalent to a domain of the corresponding server of the first client device according to domain information included in the communication configuration of the first and second client devices, and
determining whether the communication configuration of the second client device is changed according to receipt of a signal from the second client device and whether to update a group of the second client device to another group according to the changed communication configuration of the second client device.

2. The monitoring apparatus according to claim 1, wherein the communication configuration includes information relating to a corresponding server with which a client device communicates for exchanging e-mail.

3. A monitoring method for monitoring communication configurations of a plurality of client devices, the monitoring method executed by a processing device comprising:
determining whether each of the plurality of client devices is operable to communicate with a corresponding server set in the communication configurations;
identifying a first client device and a second client device from among the plurality of client devices, the first client device not operable to communicate with a corresponding server set in a communication configuration of the first client device, the second device grouped with the first client device in management information and operable to communicate with a corresponding server set in a communication configuration of the second client device;
executing a process for notifying the second device of a changed communication configuration when the corresponding server of the second device belongs to a domain equivalent to a domain of the corresponding server of the first client device according to domain information included in the communication configuration of the first and second client devices; and
determining whether the communication configuration of the second client device is changed according to receipt of a signal from the second client device and whether to update a group of the second client device to another group according to the changed communication configuration of the second client device.

4. The method according to claim 3, wherein the communication configuration includes information relating to a corresponding server with which a client device communicates for exchanging e-mail.

5. A system comprising:
a plurality of client devices; and
a monitoring apparatus operable to access management information for the plurality of client devices including information on grouping of the client devices and by a computer processor to execute:
identifying a first client device and a second client device from among the plurality of client devices, the first client device not operable to communicate with a corresponding server set in a communication configuration of the first client device, the second device grouped with the first client device in management information and operable to communicate with a corresponding server set in a communication configuration of the second client device;

executing a process for notifying the second device of a changed communication configuration when the corresponding server of the second device belongs to a domain equivalent to a domain of the corresponding server of the first client device according to domain information included in the communication configuration of the first and second client devices; and determining whether the communication configuration of the second client device is changed according to receipt of a signal from the second client device and whether to update a group of the second client device to another group according to the changed communication configuration of the second client device.

6. The system according to claim 5, wherein the communication configuration includes information relating to a corresponding server with which a client device communicates for exchanging e-mail.

* * * * *